(12) United States Patent
Jung et al.

(10) Patent No.: US 9,106,928 B2
(45) Date of Patent: Aug. 11, 2015

(54) APPARATUS AND METHOD FOR ENCODING AND DECODING MULTILAYER VIDEOS

(75) Inventors: Jae-Woo Jung, Cheonan-si (KR); Dae-Hee Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 429 days.

(21) Appl. No.: 12/716,556

(22) Filed: Mar. 3, 2010

(65) Prior Publication Data

US 2010/0226427 A1 Sep. 9, 2010

Related U.S. Application Data

(60) Provisional application No. 61/267,384, filed on Dec. 7, 2009.

(30) Foreign Application Priority Data

Mar. 3, 2009 (KR) .................. 10-2009-0018039

(51) Int. Cl.
| | |
|---|---|
| H04N 11/04 | (2006.01) |
| H04N 19/59 | (2014.01) |
| H04N 19/30 | (2014.01) |
| H04N 19/117 | (2014.01) |
| H04N 19/186 | (2014.01) |
| H04N 19/184 | (2014.01) |
| H04N 19/187 | (2014.01) |

(52) U.S. Cl.
CPC ............ *H04N 19/59* (2014.11); *H04N 19/117* (2014.11); *H04N 19/184* (2014.11); *H04N 19/186* (2014.11); *H04N 19/187* (2014.11); *H04N 19/30* (2014.11)

(58) Field of Classification Search
USPC ........................ 375/240.16–240.29
See application file for complete search history.

(56) References Cited

U.S. PATENT DOCUMENTS

| 5,422,672 | A | 6/1995 | Horst et al. |
|---|---|---|---|
| 6,266,817 | B1* | 7/2001 | Chaddha .................. 725/146 |
| 7,643,560 | B2* | 1/2010 | Hong et al. ............ 375/240.25 |
| 7,853,088 | B2 | 12/2010 | Sakazume et al. |

(Continued)

FOREIGN PATENT DOCUMENTS

| CN | 1575603 A | 2/2005 |
|---|---|---|
| CN | 1985514 A | 6/2007 |

(Continued)

OTHER PUBLICATIONS

International Search Report for PCT/KR2010/001343 issued Oct. 15, 2010 [PCT/ISA/210].

(Continued)

*Primary Examiner* — Tat Chio
*Assistant Examiner* — Nguyen Truong
(74) *Attorney, Agent, or Firm* — Sughrue Mion, PLLC

(57) ABSTRACT

A multilayer video encoding/decoding apparatus and method using residual videos, in which a base layer video is output by decoding a base layer bitstream, individual layer videos are output by decoding encoded individual layer bitstreams, format up-conversion is performed on the base layer video and at least one of the individual layer residual videos, and individual layer videos having different formats from the base layer video are reconstructed using the conversion results.

18 Claims, 6 Drawing Sheets

(56) References Cited

U.S. PATENT DOCUMENTS

| | | | |
|---|---|---|---|
| 7,889,937 B2* | 2/2011 | Kirenko | 382/240 |
| 8,126,054 B2* | 2/2012 | Hsiang | 375/240.12 |
| 8,259,800 B2* | 9/2012 | Wang | 375/240.12 |
| 2004/0258319 A1 | 12/2004 | Bruls | |
| 2005/0259729 A1 | 11/2005 | Sun | |
| 2006/0165304 A1 | 7/2006 | Lee et al. | |
| 2007/0025439 A1 | 2/2007 | Han et al. | |
| 2007/0086520 A1 | 4/2007 | Kim | |
| 2007/0121723 A1 | 5/2007 | Mathew et al. | |
| 2007/0140350 A1 | 6/2007 | Sakazume et al. | |
| 2008/0095450 A1 | 4/2008 | Kirenko | |
| 2010/0157146 A1 | 6/2010 | Jung et al. | |

FOREIGN PATENT DOCUMENTS

| | | | |
|---|---|---|---|
| CN | 101288308 A | | 10/2008 |
| EP | 1 933 564 A1 | | 6/2008 |
| JP | 63-306789 A | | 12/1988 |
| JP | 6-70340 A | | 3/1994 |
| JP | 8-186827 A | | 7/1996 |
| JP | 9-172643 A | | 6/1997 |
| JP | 2007-174634 A | | 7/2000 |
| JP | 2001-094982 A | | 4/2001 |
| KR | 1020070012169 | | 1/2007 |
| KR | 10-2010-0073725 A | | 7/2010 |
| WO | 03/036979 A1 | | 5/2003 |
| WO | 2007-024106 A1 | | 3/2007 |
| WO | 2007-043821 A1 | | 4/2007 |
| WO | 2008086423 A3 | | 7/2008 |
| WO | 2009-003499 A1 | | 1/2009 |

OTHER PUBLICATIONS

Communication, dated Jan. 15, 2013, issued by the Japanese Patent Office in counterpart Japanese Patent Application No. 2011-552888.
Communication, dated Dec. 12, 2012, issued by the European Patent Office in counterpart European Patent Application No. 10748962.7.
Park, Ji Ho, et al., "Requirement of Color Space Scalability," Joint Video Team (JVT) of ISO/IEC MPEG & ITU-T VCEG, 25th Meeting, Shenzhen, CN, Oct. 24, 2007, pp. 1-9.
Communication dated Jul. 8, 2013 issued by the State Intellectual Property Office of P.R. China in counterpart Chinese Patent Application No. 201080010682.4.
Communication dated May 28, 2013 issued by the Japanese Patent Office in counterpart Japanese Patent Application No. 2011-552888.
Communication issued on Jan. 13, 2015 by the Korean Intellectual Property Office in related application No. 1020090018039.

* cited by examiner

```
if('Lower Layer Resolution' == 'Higher Layer Resolution')
{
    BIT UPCONVERSION
        if(BIT_UPCONVERSION='Low Pass Filter'||
                BIT_UPCONVERSION=='Bit Shifting'){
            ENHANCEMENT_LAYER_TONE_MAP_FLAG
        }
        if(BIT_UPCONVERSION=='Low Pass Filter'){
            SMOOTHING_WND
        }
}
else {
    ENHANCEMENT_LAYER_TONE_MAP_FLAG
}
CHROMA UPCONVERSION
If(isToneMappingNecessary()){
    'Tone Mapping Parameter Syntax'
}
}
```

FIG.6

APPARATUS AND METHOD FOR ENCODING AND DECODING MULTILAYER VIDEOS

CROSS-REFERENCE TO RELATED APPLICATION

This application claims priority from Korean Patent Application filed in the Korean Intellectual Property Office on Mar. 3, 2009 and assigned Serial No. 10-2009-0018039, and priority under 35 U.S.C. §119(e) to U.S. Provisional Application No. 61/267,384, which was filed in the United States Patent and Trademark Office on Dec. 7, 2009, the entire disclosures of which are hereby incorporated by reference.

BACKGROUND

1. Field

The exemplary embodiments relate generally to an apparatus and method for encoding/decoding videos to offer high-definition services in various network and device environments, and more particularly, to an apparatus and method for encoding/decoding multilayer videos using residual videos.

2. Description of the Related Art

Multilayer video encoding/decoding has been proposed to satisfy many different Qualities of Service (QoS) determined by various bandwidths of the network, various decoding capabilities of devices, and user's control. That is, an encoder generates multilayer video bitstreams by means of single encoding, and a decoder decodes the multilayer video bitstreams according to its decoding capability. Temporal and spatial Signal-to-Noise Ratio (SNR) layer encoding can be achieved, and two or more layers are available depending on the application scenario.

However, the conventional multilayer video encoding/decoding method using the correlation between a base layer bitstream and an enhancement layer bitstream in a multilayer video has high complexity, and its complexity depends on the features of a base layer encoder/decoder. Therefore, the conventional multilayer video encoding/decoding method significantly increases in the complexity when it forms two or more enhancement layers.

In addition, the multilayer video decoding method requires a clear way to perform bit depth conversion, resolution conversion, chroma conversion, and selective tone mapping in a combined manner, all of which are needed to convert the base layer and enhancement layer videos.

SUMMARY

An exemplary embodiment is to address at least the above-mentioned problems and/or disadvantages and to provide at least the advantages described below. Accordingly, an exemplary embodiment provides a multilayer video encoding/decoding apparatus and method having low complexity with use of residual videos.

Another exemplary embodiment provides a multilayer video encoding/decoding apparatus and method capable of using any encoder for a base layer.

A further another exemplary embodiment provides a multilayer video encoding apparatus and method capable of offering video services to various devices in various network environments since an increase in the complexity is not significant even when it generates bitstreams forming two or more enhancement layers.

Yet another exemplary embodiment provides a multilayer video decoding apparatus and method capable of maintaining video characteristics, if possible, when performing format up-conversion for multilayer video decoding.

In accordance with one exemplary embodiment, there is provided a multilayer video encoding method for encoding an input video on a layer-by-layer basis. The method includes generating a base layer bitstream by performing format down-conversion on the input video and encoding the format down-converted video; and generating layer bitstreams of different formats by encoding residual videos obtained from the input video.

In accordance with another exemplary embodiment, there is provided a multilayer video encoding apparatus for encoding an input video on a layer-by-layer basis. The apparatus includes a base layer encoder which generates a base layer bitstream by encoding the input video undergoing format down-converted input video; and residual encoders which generate layer bitstreams having different formats by encoding residual videos obtained from the input video.

In accordance with a further another exemplary embodiment, there is provided a multilayer video decoding method for decoding layer videos. The method includes outputting a base layer video by decoding a base layer bitstream; outputting residual videos by decoding encoded layer bitstreams; and performing format up-conversion on the base layer video and at least one of the layer videos, and reconstructing the layer videos having different formats using the format up-converted at least one of the layer videos.

In accordance with yet another exemplary embodiment, there is provided a multilayer video decoding apparatus for decoding individual layer videos. The apparatus includes a base layer decoder which outputs a base layer video by decoding a base layer bitstream; residual decoders which output residual videos by decoding encoded layer bitstreams; format up-converters which perform format up-conversion on the base layer video and layer residual videos; and at least one video reconstruction which output reconstructed individual layer videos by adding outputs of the at least one residual decoders and the format up-converters.

BRIEF DESCRIPTION OF THE DRAWINGS

The above and other aspects, features and advantages of certain exemplary embodiments will be more apparent from the following description taken in conjunction with the accompanying drawings, in which:

FIG. 6 is a diagram showing an example of a bitstream syntax by which a decoder should receive from an encoder the information needed to perform the video conversion process of FIG. 5.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions are omitted for clarity and conciseness. Expressions such as "at least one of," when preceding a list of elements, modify the entire list of elements and do not modify the individual elements of the list.

In the following description, exemplary embodiments consider a multilayer video encoding/decoding scheme for processing 3-layer videos that include one base layer and two enhancement layers for convenience purpose only. In addition, 3-layer encoding means generating 3 bitstreams, and 3-layer decoding means reconstructing 3 bitstreams. The number of layers is subject to change depending on the application scenario.

Figure 1:
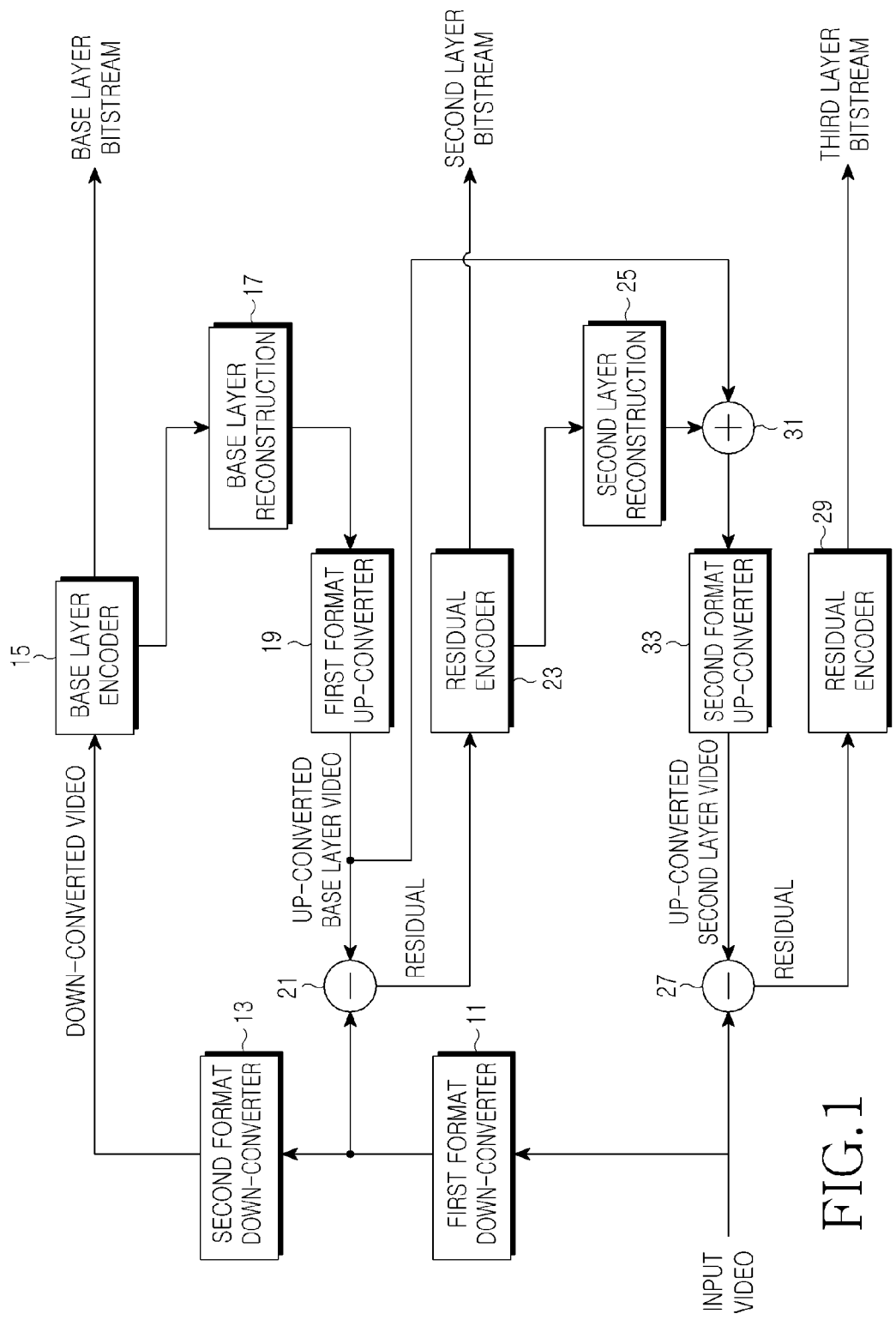
FIG. 1 is a diagram showing a structure of a multilayer video encoding apparatus according to an exemplary embodiment.

FIG. 1 shows a structure of a multilayer video encoding apparatus according to an exemplary embodiment.

The exemplary embodiment of FIG. 1 down-converts an original input video twice, for 3-layer encoding. Through this process, two videos are generated from the original input video. It is assumed that the twice down-converted video is a base layer video, the once down-converted video is a second layer video, and the original input video is a third layer video.

The base layer video is encoded by an arbitrary standard video codec, thereby generating a base layer bitstream. The encoding apparatus of FIG. 1 generates a second layer bitstream by encoding a residual video, which is a difference between the second layer video and an up-converted base layer video that is obtained by performing reconstruction on the base layer bitstream and performing format up-conversion on the base layer bitstream on which the reconstruction has been performed. Further, the encoding apparatus generates a third layer bitstream by encoding a residual video, which is a difference between the third layer video, or the original input video, and an up-converted second layer video that is obtained by performing reconstruction on the second layer bitstream, synthesizing the second layer bitstream on which the reconstruction has been performed, with the up-converted base layer video, and performing format up-conversion on the synthesized video. By repeating the processes to generate the third layer bitstream, a fourth or higher layer bitstream may be generated. This process will be described in detail below with reference to FIG. 1.

The encoding apparatus in FIG. 1 sequentially down-converts the input video (or the original video) using a first format down-converter 11 and a second format down-converter 13. Through this process, two videos are generated from the original video. A video obtained by down-converting the input video twice, i.e., a video output from the second format down-converter 13, is a base layer video. A video obtained by down-converting the input video once, i.e., a video output from the first format up-converter 11, is a second layer video. The original input video is a third layer video. A base layer encoder 15 generates a base layer bitstream by encoding the base layer video. An arbitrary standard video codec such as VC-1 and H.264 may be used as the base layer encoder 15.

A residual encoder 23 generates a second layer bitstream by encoding a residual video. The residual video is a difference between the second layer video and a video that is obtained by performing reconstruction on the base layer bitstream and performing format up-conversion on the base layer bitstream on which the reconstruction has been performed. A base layer reconstruction 17 performs reconstruction on the base layer bitstream, and the base layer bitstream on which the reconstruction has been performed, undergoes a format up-conversion process in a first format up-converter 19. A first residual determiner 21 outputs a residual video by determining a difference between the second layer video and an up-converted base layer video obtained through the format up-conversion process. In another embodiment, the determiner 21 may be a detector which detects a difference between the second layer video and the up-converted base layer video obtained through the format up-conversion process. The determiners herein below may be detectors.

A second layer reconstruction 25 performs reconstruction on the second layer bitstream output from the residual encoder 23. The second layer bitstream on which the reconstruction has been performed, is synthesized with the video output from the first format up-converter 19 in a synthesizer 31. An output of the synthesizer 31 undergoes format up-conversion in a second format up-converter 33. A second residual determiner 27 outputs a residual by determining a difference between the third layer video, or the input video, and an up-converted second layer video obtained through a format up-conversion process. A residual encoder 29 generates a third layer bitstream by encoding the residual video output from the second residual detector 27. While the structure of the encoder apparatus for encoding the multilayer video including the base layer video, the second layer video and the third layer video has shown and described in the exemplary embodiment of FIG. 1, it is also possible to generate 4 or more-layer bitstreams in the same manner.

Figure 2:
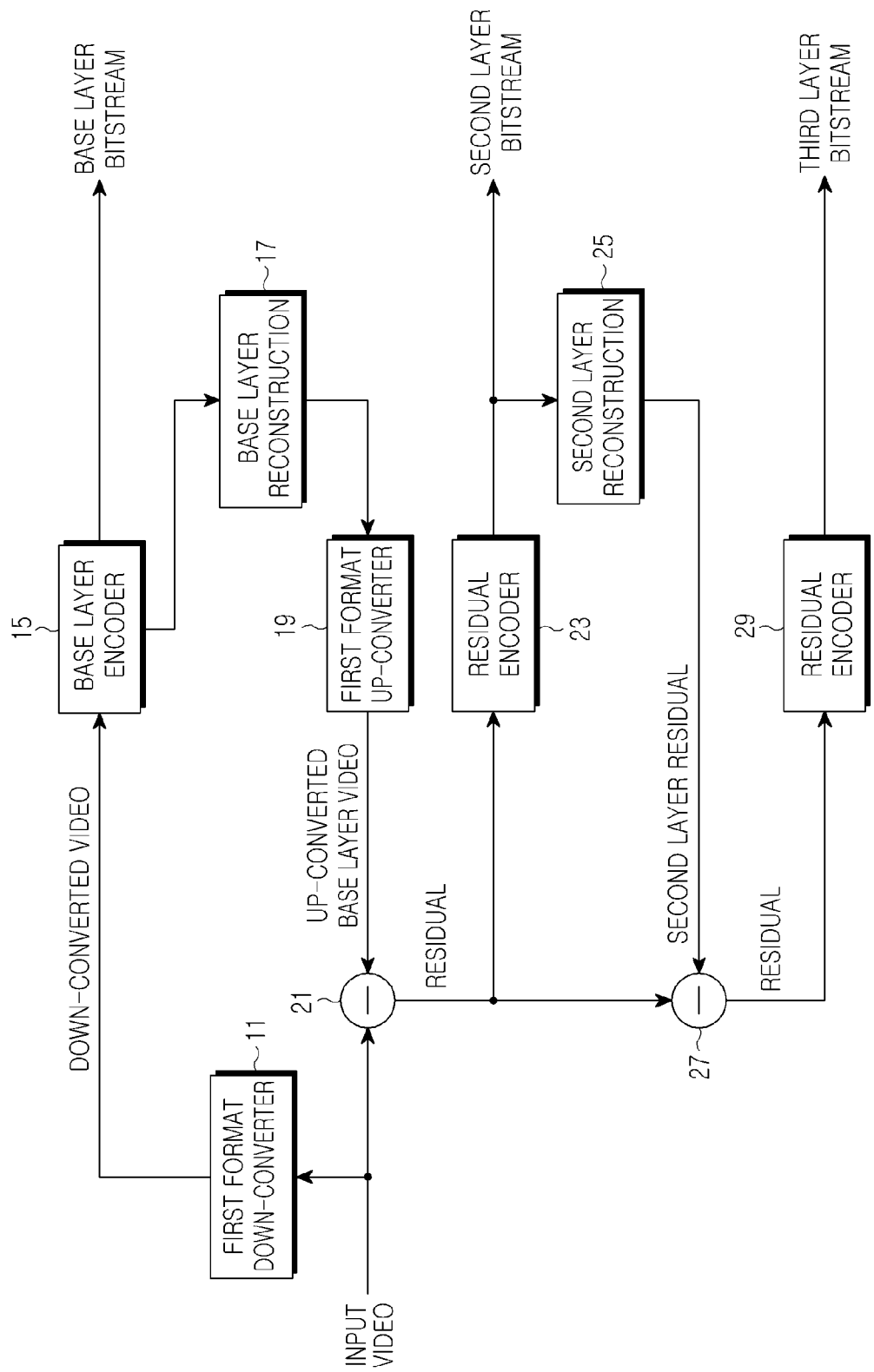
FIG. 2 is a diagram showing a structure of a multilayer video encoding apparatus according to another exemplary embodiment.

FIG. 2 shows a structure of a multilayer video encoding apparatus according to another exemplary embodiment.

A difference between the encoding apparatus of FIG. 2 and the encoding apparatus of FIG. 1 lies in the third layer bitstream. In the case of FIG. 1, the third layer bitstream is generated by encoding the residual video or the difference between the third layer video, or the input video, and the up-converted second layer video that is obtained by performing reconstruction on the second layer bitstream, synthesizing the second layer bitstream on which the reconstruction has been performed, with the up-converted base layer video, and then performing a format up-conversion process on the synthesized video. However, in the case of FIG. 2, a first residual video or a difference between the input video and an up-converted base layer video obtained by performing reconstruction on the base layer bitstream and performing a format up-conversion process on the base layer bitstream on which the reconstruction has been performed, is input to the residual encoder 23 for generating the second layer bitstream, and a second residual video or a difference between the first residual video and a second-layer residual video obtained by performing reconstruction on the second layer bitstream is generated. The third layer bitstream is generated by encoding the second residual video in the residual encoder 29.

In other words, there is a difference in that multilayer video encoding in various formats is possible through format conversion in the exemplary embodiment of FIG. 1, while no format conversion exists between the second layer and the third layer and only SNR is scalable between these layers in the exemplary embodiment of FIG. 2.

The multilayer video encoding apparatus of FIG. 2 will be described in detail below.

Referring to FIG. 2, the first format down-converter 11 generates the base layer video by down-converting the input video. The base layer encoder 15 generates the base layer bitstream by encoding the down-converted video. The base layer reconstruction 17 performs reconstruction on the base layer bitstream. The format up-converter 19 outputs an up-converted base layer video by up-converting the base layer bitstream on which the reconstruction has been performed. The first residual determiner 21 determines the first residual video by calculating a difference between the up-converted base layer video and the input video. The residual encoder 23 generates the second layer bitstream by encoding the first residual video. The second layer reconstruction 25 reconstructs the second-layer residual video. The second residual determiner 27 determines the second residual video by calculating a difference between the reconstructed second-layer residual video and the first residual video. The residual encoder 29 generates the third layer bitstream by encoding the second residual video.

Although 3-layer video encoding has been shown and described, 4 or more-layer video encoding may also be implemented. For example, a residual encoder outputting an n-th layer bitstream is called an n-th layer encoder. Therefore, it can be described that an n-th layer encoder generates an n-th layer bitstream by encoding an (n−1)-th residual video, and a k-th layer encoder generates a k-th layer bitstream by encoding a (k−1)-th residual video. For example, n={2, . . . , k−1} where k is an integer greater than or equal to 4. On this condition, when it is assumed that a multilayer video processed by the multilayer video encoding apparatus is a 4-layer video, since n can be 2 and 3, the wording "an n-th layer encoder generates an n-th layer bitstream by encoding an (n−1)-th residual video" means that there is a second-layer encoder and a third-layer encoder.

In addition, the expression "a k-th layer encoder generates a k-th layer bitstream by encoding a (k−1)-th residual video" has been described for the last layer. In the last layer (a fourth layer in this case), only encoding of the residual video is achieved without reconstruction and format up-conversion of the lower layer video. Likewise, the exemplary embodiment of FIG. 1 may also be implemented for 4 or more-layer video encoding.

Figure 3:
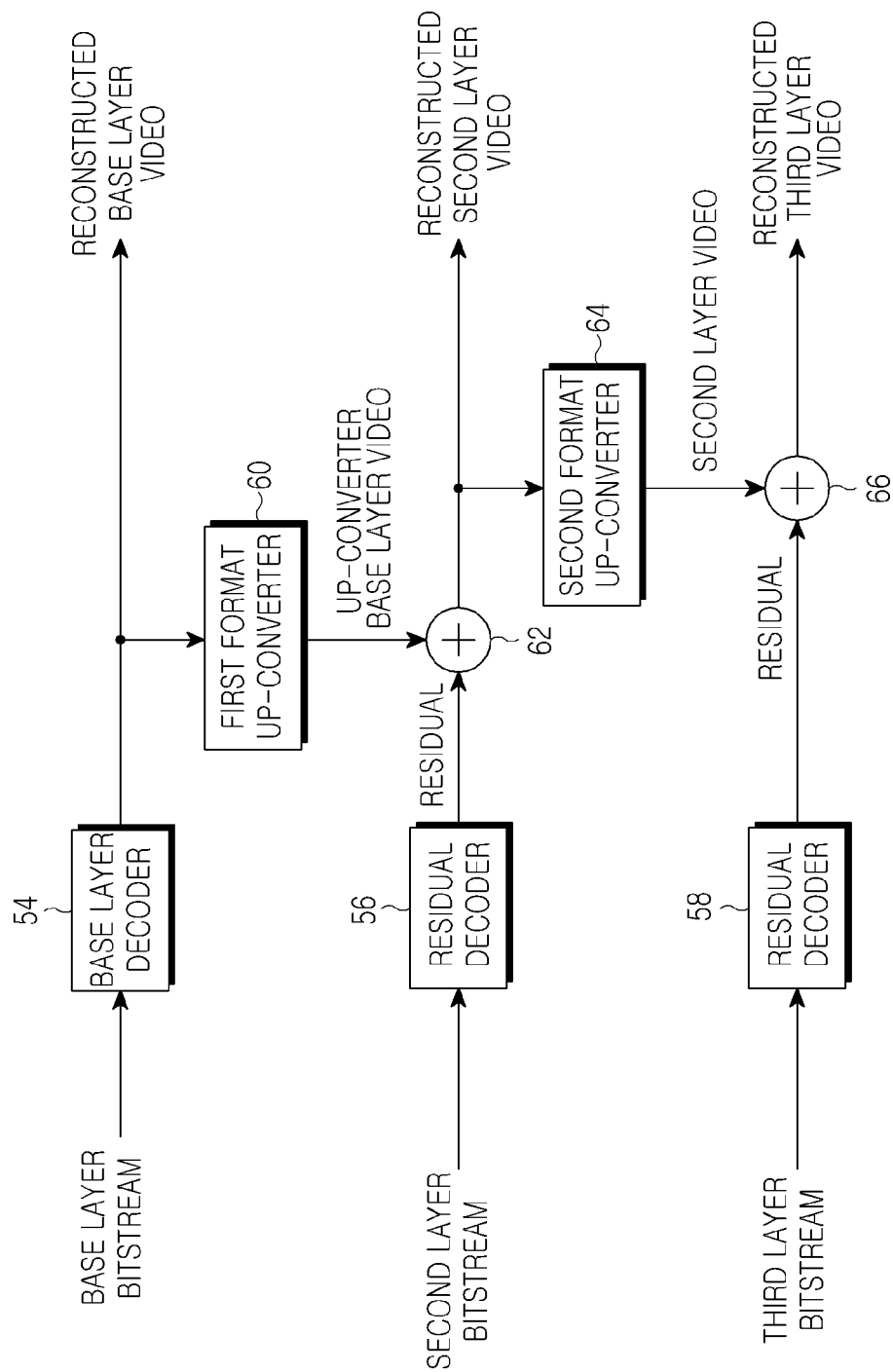
FIG. 3 is a diagram showing a structure of a multilayer video decoding apparatus according to an exemplary embodiment.
Figure 4:
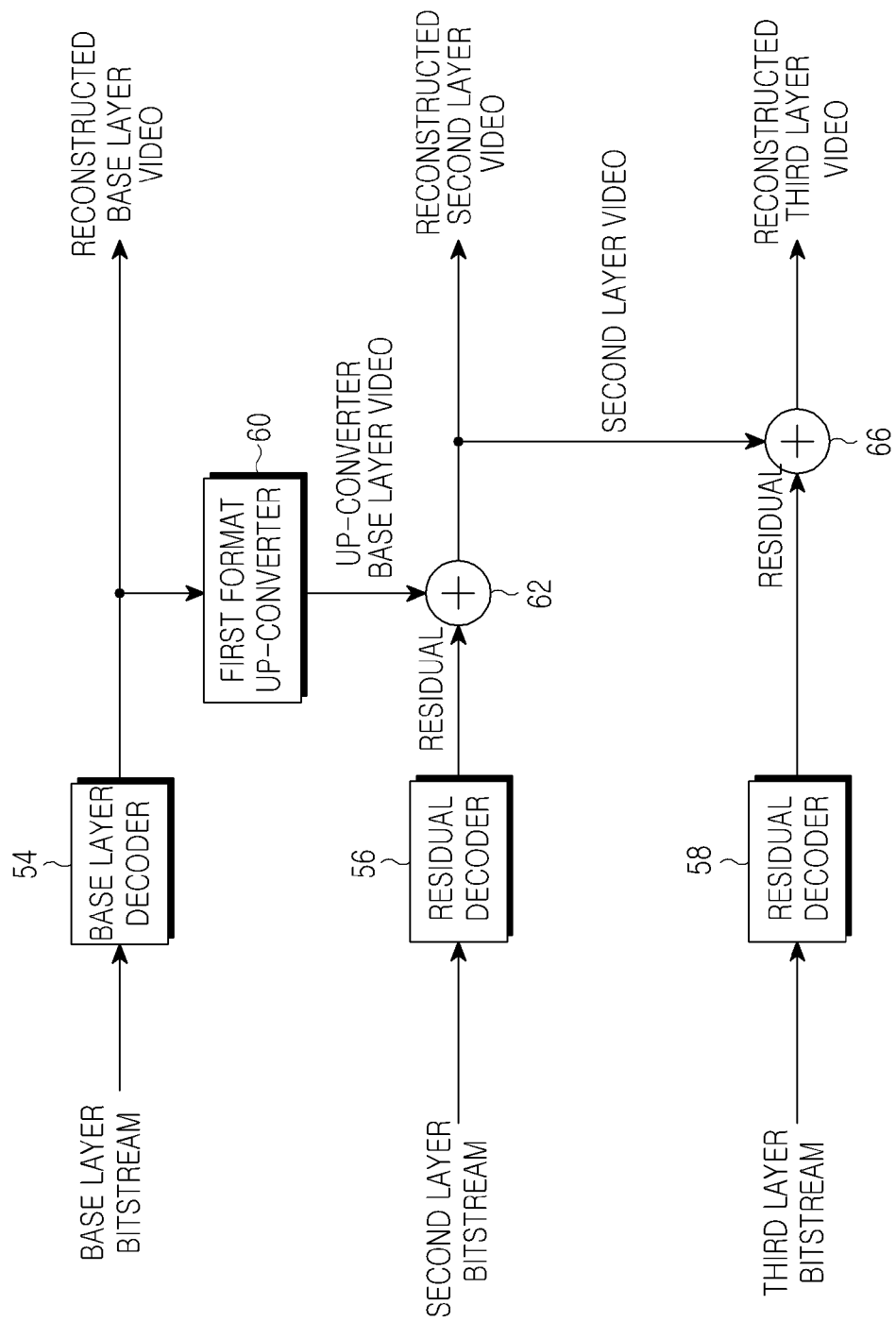
FIG. 4 is a diagram showing a structure of a multilayer video decoding apparatus according to another exemplary embodiment.

With reference to FIGS. 3 and 4, a description will be made of a multilayer video decoding apparatus according to different exemplary embodiments. It is to be noted that the multilayer video decoding apparatus of the exemplary embodiment can decode the n-th layer bitstreams encoded not only by the multilayer video encoding apparatus of FIGS. 1 and 2, but also by any other encoding apparatus using residual videos.

FIG. 3 shows a structure of a multilayer video decoding apparatus according to an exemplary embodiment.

The multilayer video decoding apparatus in FIG. 3 reconstructs a base layer video by decoding a base layer bitstream using an arbitrary standard video codec such as VC-1 and H.264. The decoding apparatus reconstructs a second layer video by decoding a second layer bitstream using a residual codec, and then adding the second-layer residual video to an up-converted base layer video obtained by performing format up-conversion on the base layer video. Further, the decoding apparatus reconstructs a third layer video by decoding a third layer bitstream using a residual codec, and then adding the third-layer residual video to an up-converted second layer video obtained by performing format up-conversion on the second layer video. In this manner, the decoding apparatus may restore 4 or more-layer videos. This process will be described in detail with reference to FIG. 3.

Referring to FIG. 3, a base layer decoder 54 reconstructs the base layer video by decoding the base layer bitstream. An arbitrary standard video codec such as VC-1 and H.264 may be used as the base layer decoder 54. A residual decoder 56 outputs a residual video by decoding the second layer bitstream, and this process can be understood with reference to the encoding process shown in FIGS. 1 and 2. In accordance with FIGS. 1 and 2, the second layer bitstream generated by the residual encoder 23 was obtained by encoding the residual video determined by the residual determiner 21. Therefore, the residual video is obtained by decoding this second layer bitstream.

The residual decoder 56 outputs a second-layer residual video by decoding the second layer bitstream. A second-layer video reconstruction 62 reconstructs the second layer video by adding the second-layer residual video to an up-converted base layer video obtained by performing a format up-conversion process on the base layer video using a first format up-converter 60.

A residual decoder 58 outputs a third-layer residual video by decoding the third layer bitstream. A third-layer video reconstruction 66 reconstructs the third layer video by adding the third-layer residual video to an up-converted second layer video. The third layer video may be, for example, a HiFi video. The up-converted second layer video is obtained by performing a format up-conversion process on the second layer video using a second format up-converter 64. A 4 or more-layer video may be reconstructed in the same manner.

FIG. 4 shows a structure of a multilayer video decoding apparatus according to another exemplary embodiment.

A difference between the structure of FIG. 4 and the structure of FIG. 3 lies in the third layer bitstream. In the structure of FIG. 4, the third layer video is reconstructed by adding the reconstructed second layer video to a third-layer residual video obtained by reconstruction the third layer bitstream. The reconstructed second layer video and the reconstructed third layer video are different in quality, but equal in format.

The decoding apparatus will be described in detail below with reference to FIG. 4.

The base layer decoder 54 in FIG. 4 reconstructs the base layer video by decoding the base layer bitstream. The second-layer residual decoder 56 outputs the second-layer residual video by decoding the second layer bitstream. The first format up-converter 60 up-converts the base layer video. The second-layer video reconstruction 62 reconstructs the second layer video by adding the second-layer residual video to the up-converted base layer video. The third-layer residual decoder 58 outputs the third-layer residual video by decoding the third layer bitstream. The third-layer video reconstruction 66 reconstructs the third layer video by adding the third-layer residual video to the reconstructed second layer video.

While the exemplary embodiment of FIG. 4 considers 3-layer video decoding, the same may also be implemented for 4 or more-layer video decoding. For example, a residual decoder decoding an n-th layer bitstream is called an n-th layer residual decoder. Therefore, it can be described that an n-th layer residual decoder outputs an n-th layer residual video by decoding an n-th layer bitstream. For example, n={3, . . . , k} where k is an integer greater than or equal to 4. On this condition, since n can be 3 and 4, the wording "an n-th layer residual decoder outputs an n-th layer residual video by decoding an n-th layer bitstream" means that there is a third-layer residual decoder and a fourth-layer residual decoder.

Likewise, the exemplary embodiment of FIG. 3 may also be implemented for 4 or more-layer video decoding.

Figure 5:
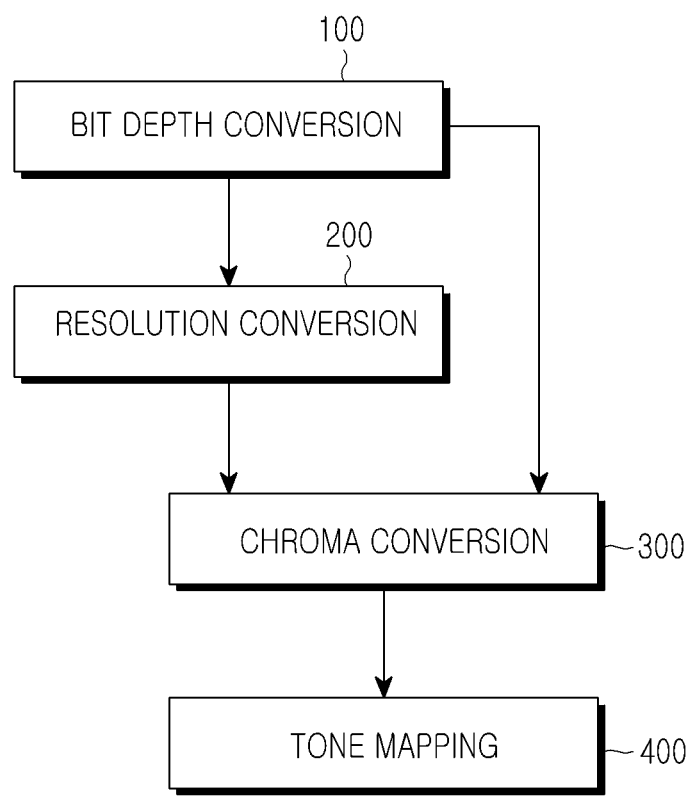
FIG. 5 is a diagram showing video conversion order necessary for format up-conversion in the exemplary embodiments of FIGS. 1 to 4.

FIG. 5 shows video conversion order necessary for format up-conversion in the exemplary embodiments of FIGS. 1 to 4.

The format up-conversion in the exemplary embodiment of FIG. 3 is a process of matching different video format among layers. Since the enhancement layers represent high-definition videos compared with the lower layer, video conversion of format up-conversion is needed. For inter-layer video conversion, resolution conversion, bit depth conversion, chroma conversion and tone mapping methods may be used. Two or more conversions may be achieved at the same time. That is, considering the priority affecting the video quality and according to the characteristics of the lower layer videos and the enhancement layer videos, video conversion may be achieved in order of bit depth conversion 100=>resolution conversion 200=>chroma conversion 300=>tone mapping 400 as shown, for example, in FIG. 5. As another example, video conversion may be performed in order of bit depth conversion 100=>resolution conversion 200=>chroma conversion 300. As another example, video conversion may be performed in order of bit depth conversion 100=>chroma conversion 300=>tone mapping 400. As another example, video conversion may be implemented in order of bit depth conversion 100=>resolution conversion 200=>tone mapping 400.

The combination of video conversions may be determined depending on the application field. The video conversion order may be determined so as to maintain the video characteristics (or video quality) if possible, and it may be maintained constant depending on the priority of video conversion.

Describing the respective conversions, the bit depth conversion 100 converts the representation unit of pixels representing the video. For example, while a video of a base layer, or a lower layer, needs 8 bits in representing one pixel, a video of an enhancement layer, or a higher layer, uses 10 bits or 12 bits in representing one pixel. An increase in bit depth increases a dynamic range of videos, enabling representation of high-definition videos.

For the bit depth conversion 100, one of the following 3 methods may be selected, which include a bit shifting-based conversion method, a Low Pass Filter (LPF)-based conversion method, and a tone mapping-based conversion method. The bit shifting-based conversion method converts the bit depth by simply shifting bits. The LPF-based conversion method may have an additional effect of canceling noises during bit depth conversion. The tone mapping-based conversion method enables restoration of videos close to the original ones by nonlinear mapping, not linear mapping, during bit depth conversion.

The resolution conversion 200 converts the size of videos. In other words, the resolution conversion 200 converts the size of a base layer video to the size of an enhancement layer video. When the base layer video is a progressive video or an interlaced video, the resolution conversion 200 is achieved, by which each enhancement layer video is converted into a progressive video or an interlaced video. When the bit depth conversion 100 and the resolution conversion 200 are both implemented, only the bit shifting-based conversion method among the three methods selectable for the bit depth conversion 100 is used for the following reason. That is, since a filter using neighboring pixels is used during the resolution conversion 200, there is less need for the LPF-based conversion during the bit depth conversion 100, and the bit depth conversion 100 and the resolution conversion 200 may be performed at the same time.

The chroma conversion 300 expands chroma samples representing one video. For example, if a chroma sample of a base layer video is YCbCr4:2:0, four Y values, one Cb value and one Cr value are needed to represent 4 pixels. If a chroma sample of an enhancement layer video is converted to YCbCr4:2:2, four Y values, two Cb values and two Cr values are needed to represent 4 pixels.

The tone mapping 400 is a method for enabling restoration of a video close to the original video by means of nonlinear mapping, not linear mapping, at a given bit depth. However, the tone mapping 400 can be used only when at least one of the bit depth conversion 100, the resolution conversion 200 and the chroma conversion 300 is performed.

FIG. 6 shows an example of a bitstream syntax by which a decoder should receive from an encoder the information needed to perform the video conversion process of FIG. 5. The bit depth conversion 100, the chroma conversion 300 and the tone mapping 400 are performed in this exemplary process.

As is apparent from the foregoing description, the exemplary embodiments can reduce complexity of the multilayer video encoding/decoding apparatus by use of residual videos. In addition, the exemplary embodiments enable multilayer video encoding and decoding, making it possible to offer the optimum video services to various devices (e.g., phone, TV, Portable Multimedia Player (PMP), etc.) having the decoding features under various network (e.g., broadband Internet, WiFi, satellite broadcasting, terrestrial broadcasting, etc.) environments. Moreover, the known standard video codec may be used for base layer encoding/decoding, guaranteeing the compatibility.

In addition, as an application scenario, the exemplary embodiments enable a laptop simulator such as a set-top box to transmit multilayer video services using various network interfaces (e.g. WiFi, HDMI, etc) For example, WiFi network using an wireless access point may provides a base layer (e.g. QVGA) video service or second layer (e.g. VGA) video service transmitted from the laptop simulator and HDMI connected to laptop simulator may provide a third layer video service (e.g. high-quality video).

Besides, the exemplary embodiments can ensure the best quality of the videos decoded in various layers by performing video conversion using bit depth conversion, resolution conversion, chroma conversion and selective tone mapping.

While the invention has been shown and described with reference to certain exemplary embodiments thereof, it will be understood by those skilled in the art that various changes in form and details may be made therein without departing from the spirit and scope of the invention as defined by the appended claims and their equivalents.

For example, the proposed multilayer encoding/decoding is based on 2-layer encoding/decoding. The multilayer encoding/decoding means 3 or more-layer encoding/decoding, and 2-layer encoding/decoding means 2-layer encoding/decoding that encodes and decodes residual videos. 3-layer encoding/decoding is possible by adding layer encoding/decoding to the 2-layer encoding/decoding once more. In the same manner, 4 or 5-layer encoding/decoding is possible.

What is claimed is:

1. A multilayer video encoding method for encoding an input video on a layer-by-layer basis, comprising:
generating a base layer bitstream by performing format down-conversion on the input video and encoding the format down-converted input video;
generating layer bitstreams of different formats by encoding residual videos obtained from the input video, reconstructing a base layer video from the base layer bitstream, and determining a first residual video by calculating a difference between a video obtained by performing format up-conversion on the reconstructed base layer video and a video obtained by performing format down-conversion on the input video; and reconstructing an n-th layer video from an n-th layer bitstream, and adding the reconstructed n-th layer video to a video obtained by performing format up-conversion in an (n−1)-th layer, and determining an n-th residual video by calculating a difference between the input video and a video obtained by performing format up-conversion on a result of the adding, wherein n={2, . . . , k−1} and k is an integer greater than or equal to 3, wherein an m-th layer bitstream is generated using videos reconstructed from an (m−1)-th layer to have the different formats, wherein m is an integer greater than or equal to 3, and wherein the generating of the base layer bitstream comprises performing (m−1) format down-conversion operations on the input video to generate the format down-converted input video.

2. A multilayer video encoding method for encoding an input video on a layer-by-layer basis, comprising:

generating a base layer bitstream by performing format down-conversion on the input video and encoding the format down-converted input video;

generating layer bitstreams having different quality by encoding residual videos obtained from the input video without format conversion, reconstructing a base layer video from the base layer bitstream and determining a first residual video by calculating a difference between the input video and a video obtained by performing format up-conversion on the reconstructed base layer video; and reconstructing an n-th layer video from an n-th layer bitstream and determining an n-th residual video by calculating a difference between the reconstructed n-th layer video and an (n−1)-th residual video, wherein n={2, . . . , k−1} and k is an integer greater than or equal to 3.

3. The multilayer video encoding method of claim 1, wherein the format up-conversion is performed using at least one of bit depth conversion, resolution conversion, chroma conversion, and tone mapping.

4. A multilayer video encoding apparatus for encoding an input video on a layer-by-layer basis, comprising:

a base layer encoder which generates a base layer bitstream by encoding format down-converted input video;

residual encoders which generate layer bitstreams having different formats by encoding residual videos obtained from the input video, a plurality of reconstruction which restore videos;

a plurality of format up-converters which perform format up-conversion on the reconstructed videos;

a first residual determiner which determines a first residual video by calculating a difference between a video obtained by performing format up-conversion on a reconstructed base layer video and a video obtained by format down-conversion on the input video;

an adder which adds a reconstructed n-th layer video to a video obtained by performing format up-conversion in an (n−1)-th layer;

an n-th residual determiner which determines an n-th residual video by calculating a difference between the input video and a video obtained by performing format up-conversion on a result of the adder, wherein n={2, . . . , k−1} and k is an integer greater than or equal to 3, wherein an m-th layer bitstream is generated using videos reconstructed from an (m−1)-th layer to have the different formats, wherein m is an integer greater than or equal to 3, and wherein the base layer encoder generates the base layer bitstream by encoding the format down-converted input video which is format down-converted (m−1) times.

5. A multilayer video encoding apparatus for encoding an input video on a layer-by-layer basis, comprising:

a base layer encoder which generates a base layer bitstream by encoding format down-converted input video;

a plurality of residual encoders which generate layer bitstreams having different quality by encoding residual videos obtained from the input video without format conversion, a plurality of layer reconstruction units which restore layer videos;

a plurality of format up-converters which perform format up-conversion on the reconstructed videos;

a first residual determiner which determines a first residual video by calculating a difference between the input video and a video obtained by performing format up-conversion on a reconstructed base layer video; and at least one n-th residual determiner which determines an n-th residual video by calculating a difference between a reconstructed n-th layer video and an (n−1)-th residual video, wherein n={2, . . . , k−1} and k is an integer greater than or equal to 3.

6. The multilayer video encoding apparatus of claim 4, wherein the format up-conversion is performed using at least one of bit depth conversion, resolution conversion, chroma conversion, and tone mapping.

7. A multilayer video decoding method for decoding layer videos, comprising:

outputting a base layer video by decoding a base layer bitstream;

outputting residual videos by decoding encoded layer bitstreams;

performing format up-conversion on the base layer video and at least one of the layer videos; and restoring the layer videos having different quality using the format up-converted at least one of the layer videos, wherein the restoring the layer videos comprises:

generating a reconstructed second layer video by adding a video obtained by performing the format up-conversion on the base layer video to a second layer residual video among the residual videos; and generating a reconstructed n-th layer video by adding an n-th residual video to a layer video undergoing the format up-conversion in an (n−1)-th layer, wherein n= {2, . . . , k−1} and k is an integer greater than or equal to 3.

8. The multilayer video decoding method of claim 7, wherein the reconstructed layer videos are generated by adding videos obtained by performing format up-conversion on the reconstructed layer videos at the lower layers to the residual videos at the same layers as the reconstructed layer videos to be generated.

9. The multilayer video decoding method of claim 7, wherein the reconstructed layer videos include videos having higher definitions than the base layer video.

10. A multilayer video decoding method for decoding layer videos, comprising:
- outputting a base layer video by decoding a base layer bitstream;
- outputting residual videos by decoding encoded layer bitstreams;
- performing format up-conversion on the base layer video; and
- restoring the layer videos which are different in quality,
- wherein the restoring the layer videos comprises:
- generating a reconstructed second layer video by adding a video obtained by performing the format up-conversion on the base layer video to the second layer residual video among the residual videos; and
- generating at least one reconstructed n-th layer video by adding an n-th residual video to a reconstructed (n−1)-th layer video without format conversion, wherein n={3, . . . , k−1} and k is an integer greater than or equal to 4.

11. The multilayer video decoding method of claim 7, wherein the format up-conversion is performed in order of bit depth conversion, resolution conversion, chroma conversion, and tone mapping.

12. A multilayer video decoding apparatus for decoding individual layer videos, comprising:
- a base layer decoder which outputs a base layer video by decoding a base layer bitstream;
- a plurality of residual decoders which output residual videos by decoding encoded layer bitstreams;
- a plurality of format up-converters which perform format up-conversion on the base layer video and the layer videos; and
- a plurality of layer video reconstruction units which output restored layer videos by adding outputs of the residual decoders and the format up-converters,
- wherein the plurality of layer video reconstruction units comprises:
- a second layer video reconstruction unit which generates the reconstructed second layer video by adding a video obtained by performing format up-conversion on the base layer video to the second layer residual video among the residual videos; and
- at least one n-th layer video reconstruction unit which generates a reconstructed n-th layer video by adding an n-th residual video to a layer video undergoing format up-conversion in an (n−1)-th layer, wherein n={2, . . . , k−1} and k is an integer greater than or equal to 3.

13. The multilayer video decoding apparatus of claim 12, wherein the reconstructed layer videos are generated by adding videos obtained by performing format up-conversion on the reconstructed videos at the lower layers to the residual videos at the same layers as the reconstructed layer videos to be generated.

14. The multilayer video decoding apparatus of claim 12, wherein the reconstructed layer videos include videos having higher definitions than the base layer video.

15. A multilayer video decoding apparatus for decoding individual layer videos, comprising:
- a base layer decoder which outputs a base layer video by decoding a base layer bitstream;
- a plurality of residual decoders which output residual videos by decoding encoded layer bitstreams;
- a format up-converter which performs format up-conversion on the base layer video; and
- a plurality of layer video reconstruction units which restore the layer videos which are different in quality,
- wherein the plurality of layer video reconstruction units comprises:
- a second-layer video reconstruction unit which generates the reconstructed second layer video by adding a video obtained by performing format up-conversion on the base layer video to the second layer residual video among the residual videos; and
- at least one reconstructed n-th layer video reconstruction unit which generates at least one reconstructed n-th layer video by adding an n-th residual video to a reconstructed (n−1)-th layer video, without format conversion, wherein n={3, . . . , k−1} and k is an integer greater than or equal to 3.

16. The multilayer video decoding apparatus of claim 12, wherein the format up-conversion is performed in order of bit depth conversion, resolution conversion, chroma conversion, and tone mapping.

17. The multilayer video decoding method of claim 7, wherein the format up-conversion is performed using at least one of bit depth conversion, resolution conversion, chroma conversion, and tone mapping.

18. The multilayer video decoding apparatus of claim 12, wherein the format up-conversion is performed using at least one of bit depth conversion, resolution conversion, chroma conversion, and tone mapping.

* * * * *